Aug. 10, 1943.  G. A. TINNERMAN  2,326,579
FASTENER
Filed March 25, 1940

Inventor:
GEORGE A. TINNERMAN
By H. G. Lombard
Attorney

Patented Aug. 10, 1943

2,326,579

UNITED STATES PATENT OFFICE 2,326,579

FASTENER

George A. Tinnerman, Cleveland, Ohio, assignor to Tinnerman Products, Inc., Cleveland, Ohio, a corporation of Ohio Application March 25, 1940, Serial No. 325,857

5 Claims. (Cl. 85—32)

This invention relates to improvements in various fastening installations for securing an object to a cooperating part by means of a connecting stud or equivalent screw threaded fastener which must necessarily or desirably project from said part at an angle other than substantially perpendicular to the adjacent underface thereof, or extend from a curved or other irregular shaped face of such part in fastening position for the application of a cooperating securing device to the projecting portion of such connecting stud or the like.

The usual fastening installation in which the connecting stud, or the like, projects at substantial right angles to a part secured offers no particular problem so long as the cooperating securing device, such as a spring nut or the like, may be applied directly to the projecting portion of the connecting stud to bear with generally equalized force on the surrounding area or adjacent face of the part secured or otherwise be disposed in substantially uniform bearing engagement with such part in a manner whereby the stud engaging means of the spring nut is adapted for proper most effective fastening engagement with the connecting stud. However, if an object is to be secured to a curved surface or inclined part, for example, the connecting studs in many instances cannot usually be designed for the most effective fastening installation in such a manner as to pass through openings in such a curved or inclined part and also project substantially at right angles to the adjacent face thereof. This, of course, is the situation whenever the object is to be secured to a sheet metal part, for example, having a pronounced curvature and in which the rearward face of such part also is curved when shaped to correspond to the curvature of the object secured thereto or otherwise, is of an uneven, inclined or other irregular shaped contour. Accordingly, the cooperating spring nut securing device employed must be of such nature as to bear firmly and rigidly upon such curved, uneven, inclined or irregular shaped rearward face in a manner whereby the stud engaging means of the securing device is capable of equal uniform engagement with the connecting stud in whatever position it may be disposed in providing an effective, reliable fastening installation in which the parts secured are not subject to loosening or removal incident to vibration and severe jarring effects such as take place in the operation of an automobile, for example.

By way of further example of the purpose and utility of the fastening means of the present invention, the article or object to be secured may be prepared in the manner of a casting or molded plastic part provided with integral connecting studs, the object being curved however, or having its underside of curved or other irregular contour corresponding to the surface of the part to which it is to be secured to seat firmly and rigidly thereon in attached position. In such a casting or molded plastic part, the object may, of course, be provided of any desired configuration but in order that the same may be removed from the mold form in any practical way after completion, the connecting studs must all extend in the same general direction in a manner whereby such connecting studs will not lock in the mold form and prevent the completed object from being removed therefrom after the molding operation.

For this reason, among others, it will be understood that though the connecting studs for the plastic object, casting, or the like, are provided to extend in the same general direction, said connecting studs project at varying angles to the underside of such object; consequently, when such connecting studs are passed through openings in the part to which the object is to be secured, a number of said connecting studs will project at decided angles to the adjacent rearward face of such part. Due to such angular disposition of the connecting studs, the simplest form of spring nut securing device applied directly at substantial right angles to the axis of the connecting stud cannot be employed satisfactorily, since in its final applied position, the spring nut will not have suitable uniform bearing engagement with the adjacent face of the part secured, wherefore the stud engaging means thereof are not adapted to engage the connecting stud in the most effective manner and a faulty fastening installation results.

The problems involved in fastening installations of this type are quite apparent from the foregoing, and therefore, a primary object of the present invention contemplates the provision of various improved forms of securing devices constructed in accordance with principles and teachings of the instant disclosure to provide simple, inexpensive, and easily and quickly applied means for securing such installations in a most practical and reliable manner such that the secured members are not subject to loosening or displacement under extreme conditions of vibratory motion or the like.

Another object of the invention is to provide various securing arrangements for installations wherein a connecting stud or equivalent threaded fastener extends from a curved surface of a secured part or has a decided angular disposition with respect thereto, as aforesaid, and such installations embodying improved forms of securing devices which are of such character as to compensate for such curved surface or for such angular disposition of a connecting stud with respect thereto and otherwise operate to secure the stud with the highest degree of effectiveness possible under such conditions.

A further object of the invention is for the provision of such securing means in the manner of simple, one-piece, sheet metal devices which are cheap and inexpensive to provide and lend themselves to economical quantity production in that they may be produced at relatively low cost from sheet metal strip stock with little or no loss or waste of material.

A more specific object of the invention contemplates generally the provision of various fastening installations for securing an object to a cooperating part by connecting studs or equivalent screw threaded fasteners which extend in other than perpendicular relation to the adjacent face of the part to which the object is secured and embodying one-piece sheet metal securing devices having the new and improved features of construction which provide the most effective securing action with the connecting studs, bolts, screws, rivets, or similar stud fasteners in any such relation.

Another specific object of the invention comprehends such fastening installations in which the object is secured to a part having a curved underface and with the cooperating securing device of a character adapted to compensate for such curved underface and provide the most effective fastening engagement with a connecting stud or screw threaded fastener in this relation.

Further objects and advantages and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which.

Figure 1:
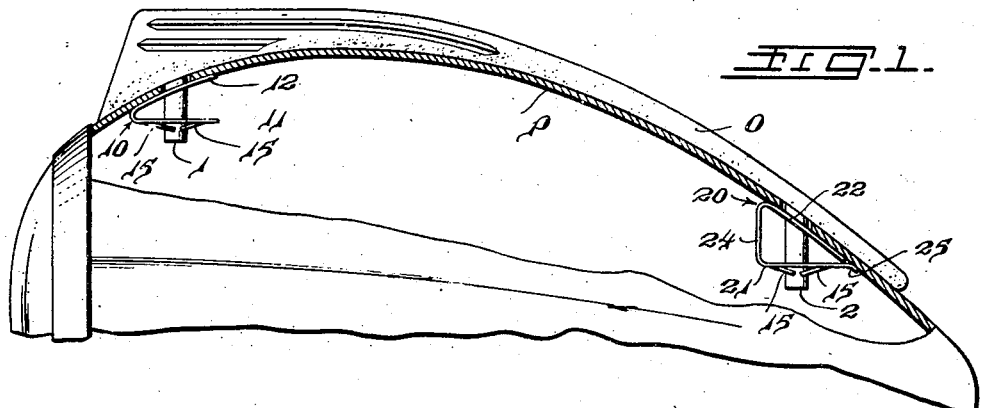
Fig. 1 is an illustration of one application of the present invention and showing in vertical section a generally curved supporting part and an object secured thereto by integral connecting studs, or the like, together with improved forms of securing devices constructed in accordance with the invention.

Referring now, more particularly, to the drawing, Fig. 1 is given as an illustration only of one application of the invention, it being understood that the invention is not limited thereby in any manner or form inasmuch as the general teachings and principles of the securing devices herein disclosed are equally adaptable to a wide range and variety of other installations. Fig. 1 is intended to illustrate the general organization of a trim strip installation or mounting of a finishing object onto a generally curved supporting part P, such as the area of the sheet metal part adjacent to or forming a portion of the casing of an automobile headlight, for example.

The finishing object or other article to be secured is designated generally O and may be provided in the manner of a plastic molding, metallic die casting, or of any other material used in commercial practice in many industries. In the present example, said object is shown provided as a one-piece article including integral connecting studs 1, 2, extending in the same general direction from the underside of said object which is of curved contour corresponding substantially to the upper face curvature of said part P in order to seat firmly and rigidly thereon. In this relation, the spaced connecting studs 1, 2, are received in correspondingly spaced openings in said part P and project therefrom at different angles to the adjacent underface thereof and other than substantially perpendicular thereto. As previously pointed out, the connecting studs 1, 2, in an installation of this character assume such position due to the fact that said connecting studs are provided on the object to extend in the same general direction in a manner whereby such integral connecting studs, as formed on the completed object, will not lock the object in the mold form and otherwise prevent the same from being easily and quickly removed therefrom after the molding operation.

Figure 2:
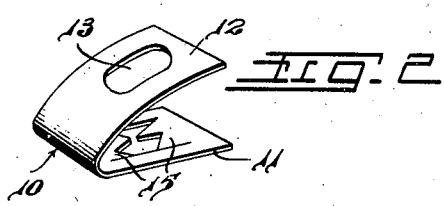
Fig. 2 is a perspective view of the securing device per se shown employed at the left of Fig. 1.

The connecting stud 1, Fig. 1, is shown as extending from the adjacent face of part P at a relatively small difference of angle from perpendicular, and in such cases the securing device is best provided for most economical quantity production in the manner of a generally U-shaped sheet metal member 10, Fig. 2, comprising a pair of spaced arms 11, 12. The arm 11 in such a securing device is preferably a substantially flat section provided with a suitable form of clutch means or stud engaging means 15 adapted for fastening engagement with the connecting stud, or for threadedly engaging an equivalent form of threaded fastener which may be employed in a similar relation. The arm 12 is provided with an enlarged opening 13 in alignment with such stud engaging means and is formed in the manner of a bearing portion having a contour conforming substantially to the general contour of the adjacent face of part P or is otherwise constructed to provide a firm, rigid, bearing engagement with such part in a manner to support the arm 11 on a plane substantially at right angles to the longitudinal axis of the connecting stud 1, substantially as shown. A preferred form of such stud engaging means is formed in the manner of cooperating tongues 15 provided by parallel slits in the metal body of arm 11 and spaced by an opening therebetween for receiving the shank of the connecting stud in positive fastening engagement therewith. As designed for use with a threadless connecting stud, rivet, or the like, said tongues are best provided to extend slightly out of the plane of the arm 11 with their extremities spaced apart a distance slightly less than the diameter of the connecting stud. The most effective biting action of the tongues with the associated connecting stud is obtained when the tongue extremities are substantially oppositely disposed and thereby adapted for substantially equal, uniform biting engagement with the connecting stud at substantially diametrically opposed points or at points lying in a substantial plane approximately normal to the longitudinal axis of the connecting stud.

It will be understood that though the opening between the extremities of the tongues 15 is slightly less than the diameter of the connecting stud, when the stud is applied through the opening in one direction, said tongues will flex outwardly to permit the ready passage of the stud to final applied fastening position, whereupon the extremities of said tongues, being relatively sharp, are adapted to bite or clutch the connecting stud to prevent reverse axial movement or other relative movement of the connecting stud with respect thereto from such applied fastening position. In one form, the said tongues 15 are slightly inclined out of the plane of the adjacent metal body to facilitate the initial insertion of the connecting stud through the opening therebetween to spread said tongues as necessary and cause the same to assume opposing inclined positions in which the tongue extremities bite into the connecting stud in frictional gripping relation therewith. In another form, said tongues may be provided to lie substantially in the general plane of the adjacent metal body whereupon the insertion of the connecting stud will cause the same to flex outwardly to opposing inclined positions in which the tongue extremities bite into the connecting stud in a similar manner.

Preferably said tongues 15 are notched at their extremities to provide sharp jaws adapted to cut deeply into a connecting stud under tension to provide a positive locking effect therewith in applied fastening position such that any movement toward withdrawal of the connecting stud will be tenaciously resisted by the tensioned tongues due to their inclined positions in a direction opposed to the reverse axial movement of the connecting stud from such applied fastening position. In effect, any outward pull on the object to remove the connecting stud from engagement with the tensioned tongues causes such jaws to cut still deeper into the root of the connecting stud and provide an even more positive locking action therewith.

As best seen in Fig. 2, in the securing device thus provided, the opening 13 in arm 12 is enlarged and in suitable alignment with the opening between the tongues 15 carried by arm 11. Said opening 13 is preferably enlarged to provide any clearance necessary to compensate for possible unforseen variations in the disposition of the connecting stud and otherwise permit quick and easy insertion of the connecting stud through said opening 13 to fastening engagement with said stud engaging tongues 15. In this relation, the most effective fastening engagement is obtained, as stated, when the tongue extremities are adapted for substantially equal, uniform biting engagement with the connecting stud at generally diametrically opposed points or at points lying in a substantial plane approximately at right angles to the longitudinal axis thereof; and, in order to ensure this desired fastening engagement, the bearing arm 12 of the device is designed in accordance with the contour of the adjacent underface of the part P on which it bears in order to maintain or otherwise dispose the cooperating arm 11, carrying the stud engaging tongues 15, on an approximately normal plane to the longitudinal axis of the connecting stud in whatever angular disposition the stud may have with respect to said underface of part P. This is accomplished, as stated, by providing the bearing arm 12 of a contour corresponding substantially to the contour of the adjacent underface of part P to bear firmly and rigidly thereon or otherwise designing said arm to bear with generally equalized force on said part in maintaining the arm 11 of the securing device in suitable spaced relation to the adjacent underface of said part P in the desired position for most effective fastening engagement of the tongues 15 with the connecting stud, as aforesaid.

Figure 3:
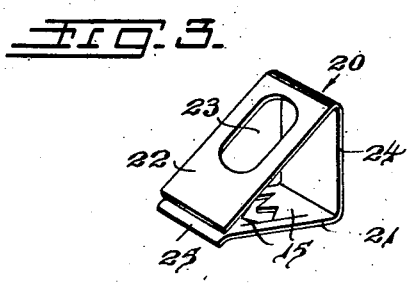
Fig. 3 is a perspective of the securing device per se shown employed at the right of Fig. 1.

Fig. 3 shows another form of securing device constructed in accordance with the present invention which is similar in application and use to that described with reference to Fig. 2, but is more advantageously employed where the connecting stud has a greater angular disposition with respect to the adjacent underface of the supporting part. Thus, as illustrated in Fig. 1, the angular disposition of stud 2 with respect to the adjacent underface of part P is such that a securing device of the type shown in Fig. 3 will provide a most effective fastening installation embodying a sheet metal fastener even though a difficult angle is involved and the installation must be carried out in close quarters. The securing device of Fig. 3 is constructed in a generally triangular configuration comprising the arm 21 carrying the selected form of stud engaging means, such as tongues 15 similar to those described in Fig. 2, and a bearing arm 22 provided with an enlarged opening 23 in alignment with said tongues, these arms 21, 22, being rigidly supported by the intermediate connecting section 24 in the desired form of the securing device. Said arm 21 may include an end portion 25 in line with the general path of bearing arm 22 to cooperate therewith in enhancing the effectiveness of the installation as a whole by increasing the rigidity of the sheet metal securing device in applied fastening position with the connecting stud.

Accordingly, in the completed installation of Fig. 1 embodying such a securing device 20, it will be understood that the securing device is applied substantially in the manner described with reference to Fig. 2 with the connecting stud 2 passing through opening 23 in arm 22 to the position at which the similar form of stud engaging tongues 15 on arm 21 engage the connecting stud in the most effective manner, as aforesaid. To this end, the bearing portions of the securing device comprising bearing arm 22 and end portion 25 are designed in accordance with the contour of the adjacent underface of part P in order to maintain or otherwise dispose the arm 21 carrying the stud engaging tongues 15 on a plane approximately normal to the axis of the associated connecting stud 2. This arrangement is best provided by forming the bearing arm 22 and end portion 25 to lie in a path having a contour conforming substantially to the adjacent underface of part P to bear firmly and rigidly thereon and, of course, the specific configuration of such bearing portions may be varied somewhat, if desired, so long as the same bear with generally equalized force on said part P to maintain or otherwise dispose the arm 21 carrying the stud engaging tongues 15 in the desired position in a plane approximately normal to the longitudinal axis of the connecting stud. In this relation, as aforesaid, said tongues 15 are adapted for the most effective fastening engagement with the connecting stud at substantially diametrically opposed points in equal uniform biting engagement therewith.

Figure 4:
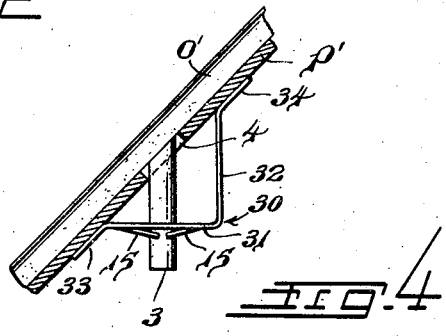
Fig. 4 is a vertical sectional view of a further embodiment of the invention in which another form of securing device is employed.

Fig. 3 shows a similar fastening installation embodying another form of securing device 30 in which the extremities of the sheet metal section are formed to provide the bearing portions of the device in accordance with the contour of the adjacent underface of the supporting part P' and the angular disposition of the connecting stud 3 on the object O' secured to such part. Fig. 4 is intended to illustrate also an installation in which the stud passage 4 may perhaps by necessity be punched in part P' along lines normal to the plane thereof with the usual connecting stud 3 readily received in such stud passage, as shown, to project therefrom in an angular relationship other than perpendicular to the adjacent underface of such part P'. In any event, the securing device 30 may also be constructed from a simple, inexpensive section of sheet metal bent to the general configuration shown to include an arm 31, provided with the selected form of stud engaging means such as tongues 15, and a cooperating bearing arm 32 of such character as to maintain or dispose said arm 31 on a plane approximately normal to the axis of stud 3, thereby ensuring the most effective fastening action of said tongues 15 with the connecting stud in substantially equal, uniform biting engagement therewith, substantially as described with reference to Fig. 2. In order to increase the rigidity of the fastening device in such applied fastening position, the extremities of said arms 31, 32, are provided in the manner of bearing surfaces 33, 34, respectively, which are designed in accordance with the inclined contour of the underface of part P' to firmly and rigidly bear thereon with generally equalized force in applied fastening position.

Figure 6:
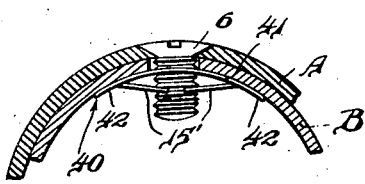
Figure 5:
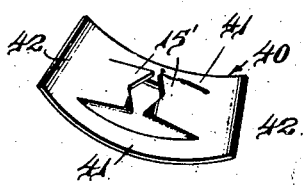
Fig. 5 is a perspective view of a securing device employed in another embodiment of the invention in which the supporting part is of generally curved configuration; and, Fig. 6 is a sectional view illustrating one application and use of the securing device shown in Fig. 5.

Figs. 5 and 6 show a further embodiment of the invention in which cooperating generally curved parts A, B, as illustrated in Fig. 6, for example, are fastened by a securing device of the general character shown in Fig. 5 which is especially adapted for firm, rigid bearing engagement with the generally curved underface of the supporting part B to which part A is secured by a bolt or screw threaded fastener 6, although a rivet or other threadless connecting stud integrally provided on the part A may be employed, if desired, in any related form of installation. The securing device 40, Fig. 5, is constructed from a small, inexpensive section of sheet metal with the stud engaging tongues 15' provided from the body of the sheet metal section being similar to those of the previously described forms of the invention except that the extremities of said tongues are so shaped as to lie on a helix corresponding to the thread of the threaded fastener for most effective uniform, threaded engagement therewith. In this relation, the body of said securing device is of such nature as to bear with generally equalized force on the adjacent underface of the part secured or otherwise bear upon the same in a manner whereby the tongues 15' will be suitably supported in the position necessary for ensuring such uniform threaded engagement of the tongue extremities with the threaded fastener. In the previous forms of the invention, a separate and distinct arm member forms the bearing portion which is provided in accordance with the contour of the adjacent supporting part and the disposition of the connecting stud with respect thereto.

In the present illustration, an equivalent structure is provided but of less material and reduced cost in that the body of the sheet metal securing device adjoining said tongues 15 is utilized to form the bearing portion of the device. Thus, on either side of said tongues 15, Fig. 5, the body of the securing device comprising the side or bridge portions 41 are bent into bearing arm portions together with the end portions 42, to assume a generally concave configuration corresponding substantially to the contour of the adjacent underface of part B to bear firmly and rigidly thereon, as shown in Fig. 6. Said tongues 15' thereby extend directly from said base in the direction generally opposite to the general concave configuration thereof and are thereby supported by said base of the securing device in the position for maintaining the tongue extremities in uniform threaded engagement with the threaded fastener 6 at all times, as aforesaid. Accordingly, the bolt or screw 6 may be tightened to any practical degree as may be necessary, without danger of collapse or distortion of said tongues 15' or otherwise diminishing the effectiveness of the tongue extremities in uniform threaded engagement with the threaded fastener in the final applied position thereof securing the parts A, B, in a completed installation. Likewise, in the event a rivet or an integral connecting stud on part A was employed in the place of the bolt 6, the extremities of said tongues 15' would be supported in the desired position for equal, uniform biting engagement with such connecting stud at substantially diametrically opposed points or at points lying in a plane at substantial right angles to longitudinal axis thereof in providing the most effective fastening installation of this character, substantially as described with reference to the forms of the invention illustrated in Figs. 1-4 inclusive.

Although the securing devices of the present invention are shown as constructed of one-piece sections of relatively thin sheet metal, preferably spring steel, and provided with integral, yieldable substantial tongues struck and formed therefrom, it is fully intended as within the scope of this invention, that the securing devices be constructed from any other suitable sheet metal material such as cold rolled metal, and the like, and provided with various other equivalent forms of stud engaging means. The invention also comprehends the use of connecting studs of any desired cross section and, if expedient or desirable, provided with shoulders, abutments, grooves, etc., cooperating with the stud engaging means of the securing device in a manner tending to resist withdrawal of a connecting stud and preventing removal of an object as secured to a supporting part in applied fastening position.

It will be quite readily recognized that the several forms of securing devices of the present invention are inexpensive, simple, durable, light-in-weight, and easily and quickly applied to fastening position by reason of the cooperating yieldable friction tongue elements thereof which, initially, present a substantial socket opening for readily receiving the stud, and subsequently flex to permit the connecting stud to be advanced axially to home position with the extremities of said tongues disposed in equal and uniform biting engagement with a threadless connecting stud or in uniform threaded engagement with a threaded fastener in securing an installation in the most effective manner. The yieldable action of the tongues allows them to serve substantially as spring tongues in which relation they are adapted for use with connecting studs of different diameters and various cross-sections in addition to providing a substantially positive locked mounting of an object in assembled relation on a supporting part.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, will all changes falling within the scope, meaning and range of equivalency of the claims intended to be embraced therein.

Reference is made to my divisional application, Serial No. 470,548, filed December 30, 1942, for claims on the structure shown in Figs. 5 and 6.

What is claimed is:

1. A fastener for a stud projecting from an article to be secured through a supporting member comprising a single piece of sheet material bent to provide an arm engaging the inner surface of the support and a second arm integrally connected with the first arm and spaced inwardly therefrom and at an acute angle thereto, the first arm which engages the support being spaced from the stud to allow its free passage beyond the arm and the second arm having stud-engaging means coacting with said stud.

2. A fastener for a stud projecting from an article to be secured through a supporting member comprising a single piece of sheet material bent to provide an arm engaging the inner surface of the support and a second arm integrally connected with the first arm and spaced inwardly therefrom, said two arms being at an acute angle to each other and connected by a return bend, the first arm having an aperture and the second stud-engaging means, both being positioned to cooperate with said stud.

3. A fastener comprising a single sheet of metal doubled on itself to provide two arms at an acute angle to each other, one of the arms being curved and having an opening through it for the passage of a stud and the other arm having stud-engaging means deformed from the arm about an opening through it and adapted to coact with a stud passing through the first opening.

4. A fastener made of a single piece of sheet metal having three arms connected in series, one extreme arm having an opening through it for the passage of a stud, the intermediate arm leading from the end of said extreme arm at an acute angle thereto and the third arm leading from the other end of the intermediate arm at an angle to it into a region adjacent the free end of the first arm, the last mentioned arm having an opening and stud-engaging means about the opening adapted to coact with a stud passing through the openings of the first and third arms.

5. A fastening device made of a single strip of metal and having an arm with an opening through it and stud-engaging means deformed from said arm about the opening, a second arm leading from one end of the first arm at an angle thereto and two extensions leading from the free ends of said two arms, each extension being at an angle to the arm carrying it and the two lying in substantially the same plane.

GEORGE A. TINNERMAN.